United States Patent [19]

Yoshida et al.

[11] Patent Number: 4,999,551
[45] Date of Patent: Mar. 12, 1991

[54] METHOD FOR CONTROLLING OPENING/CLOSING OF DOOR IN AUTOMATIC DOOR SYSTEM

[75] Inventors: Yukio Yoshida, Namerikawa; Kenzo Ohno, Toyama, both of Japan

[73] Assignee: Yoshida Kogyo K.K., Tokyo, Japan

[21] Appl. No.: 568,078

[22] Filed: Aug. 16, 1990

[30] Foreign Application Priority Data

Aug. 17, 1989 [JP] Japan .................. 1-210570

[51] Int. Cl.⁵ ............................................. E05F 15/14
[52] U.S. Cl. ................................... 318/286; 318/466; 49/138
[58] Field of Search .................. 318/266, 282–286, 318/466–469, 65, 66, 256, 257; 49/26, 43, 138, 324, 334, 360, 357; 187/29.1, 30, 31, 51, 52 R, 56, 103; 307/10.1

[56] References Cited

U.S. PATENT DOCUMENTS

| | | | |
|---|---|---|---|
| 4,010,408 | 3/1977 | Bailey | 318/266 |
| 4,203,039 | 5/1980 | Pritchard | 361/160 |
| 4,300,662 | 11/1981 | Hmelovsky | 318/617 |
| 4,342,379 | 8/1982 | Games et al. | 318/561 |
| 4,515,246 | 5/1985 | Kajiyama et al. | 187/29 R |
| 4,563,625 | 1/1986 | Kornbrekhe et al. | 318/603 |
| 4,742,245 | 5/1988 | Yoshida et al. | |
| 4,775,823 | 4/1988 | Yoshida et al. | |
| 4,870,333 | 9/1989 | Itoh et al. | 312/266 |

FOREIGN PATENT DOCUMENTS

63-66991 12/1988 Japan.

Primary Examiner—William M. Shoop, Jr.
Assistant Examiner—A. Jonathan Wysocki
Attorney, Agent, or Firm—Hill, Van Santen, Steadman & Simpson

[57] ABSTRACT

A method for controlling opening/closing of a door in an automatic door system comprises the steps of causing the door to conduct opening operation to its opening-stop limit by an initial opening signal transmitted after the power supply is put to work and the arrival of the door at its closing-stop point is confirmed, and measuring the opening stroke at that time; causing the door to conduct closing operation to its closing-stop point when it is stopped at opening-stop point and no opening signal is inputted, and measuring the closing stroke of the door at that time; computing the difference between the measured opening and closing strokes upon stopping of the door at its closing-stop point; and outputting a signal of abnormal condition if the difference is more than a present value, or causing the door to conduct normal opening/closing operation if it is less than the preset value. Thus, the opening/closing operation of the door can be made at a high speed by a preset distance in the beginning of the whole stroke, and thereafter at a low speed.

4 Claims, 8 Drawing Sheets

METHOD FOR CONTROLLING OPENING/CLOSING OF DOOR IN AUTOMATIC DOOR SYSTEM

BACKGROUND OF THE INVENTION

1. Field of the Invention

This invention relates to a method for controlling opening/closing of a door in an automatic door system.

2. Description of the Prior Art

In general, automatic door systems are arranged such that a belt is wound round a drive pulley driven by an electric motor and a driven pulley, the belt being connected to a door, and when the motor is driven or rotated forwardly or reversely the belt is turned forwardly or reversely so as to move the door either in opening direction or in closing direction.

As such method for controlling opening/closing of a door in an automatic door system, a variety of methods have been developed.

For example, there is a method for controlling opening/closing of a door in an automatic door system as described in Japanese Laid-Open Patent Application No. Sho63-66991, wherein the door is caused to conduct an opening operation so as to move it to its opening-stop point after a power supply switch is turned on; storing in a memory counter the pulses generated during the opening operation by a rotation detector adapted to generate pulses whose count is proportional to the number of revolutions of the motor; subsequently causing the door to conduct a closing operation and also counting the pulses generated by the rotation detector during the closing operation by means of a counter; and stopping the motor when the count of the pulses corresponds to the count stored in the memory counter.

According to such a method of controlling opening/closing of a door in an automatic door system, since the distance of movement of the door is stored in a storage device by causing it to conduct an opening operation when a power supply switch is turned on, and during the subsequent closing operation or opening operation of the door the control of operations of the door is conducted on the basis of the stored distance of movement of the door, opening/closing operation of the door can be conducted without any overrun.

However, in the above-mentioned method for controlling opening/closing of a door in an automatic door system, since the distance of movement of the door is measured on the basis of the number of revolutions of the motor, if the belt is slipping, there is a possibility that the distance of movement of the door measured on the basis of the number of revolutions of the motor does not correspond to the actual distance of movement thereof, thus causing an overrun.

Further, in case the door is caused to conduct opening/closing operations, the door is moved at a high speed to a predetermined position and then decelerated by applying brake to the motor to decelerate the same so as to move the door a low speed either to its opening-stop point or to closing-stop point, and also control of opening/closing of the door is made by comparing the initial acceleration and the deceleration upon braking thereof with their respective preset values. Therefore, if the initial acceleration and the deceleration upon braking of the door differ from their respective preset values, there is a possibility of the acceleration distance and the deceleration distance of the door varying thus rendering it impossible to move the door smoothly. Stating in brief, in case the resistance to sliding door increases excessively due to abnormal conditions of the reduction gear, the door-roller and the rails, etc., or in case the acceleration force or the braking force is reduced due to abnormal conditions of the motor driving circuit, the acceleration distance and the deceleration distance will differ extremely from their respective preset values thus endangering persons who pass through it and rendering it unable to control opening and closing of the door.

SUMMARY OF THE INVENTION

The present invention has been devised in view of the above-mentioned circumstances in the prior art and has for its object to provide a method for controlling opening/closing of a door in an automatic door system which can solve the above-mentioned difficulties.

To achieve the above-mentioned object, according to a first aspect of the present invention, there is provided a method for controlling opening/closing of a door in an automatic door system comprising the steps of causing the door to conduct an opening operation to its opening-stop point by the action by an initial opening signal transmitted after a power supply switch is turned on and the arrival of the door at its closing-stop point has been confirmed, and measuring the length of opening stroke of the door at that time; causing the door to conduct a closing operation to its closing-stop point when the door is stopped at the opening-stop point and opening signal is not inputted, and measuring the length of closing stroke of the door at that time; and computing the difference between the measured length of opening stroke and that of closing stroke when the door is stopped at the closing-stop point, and outputting a signal indicative of the occurrence of abnormal condition if the difference in stroke is more than a preset value, or causing the door to conduct its normal opening/closing operation if the difference in stroke is less than the preset value.

By using this method, it can be readily checked whether or not the belt is slipping.

Further, to achieve the above-mentioned object, according to a second aspect of the present invention, there is provided a method for controlling opening/closing of a door in an automatic door system comprising the steps of causing the door to conduct a high speed opening operation over a predetermined distance by the action of an initial opening signal transmitted after a power supply switch is turned on and the arrival of the door at its closing-stop point has been confirmed, and then applying brake to a door driving motor to decelerate the same to thereby decelerate the door, and measuring the initial acceleration and the deceleration upon braking of the door; causing the door to conduct an opening operation to its opening-stop point; subsequently causing the door to conduct a high speed closing operation by a predetermined distance when the door is stopped at its opening-stop point and door opening signal is not inputted, and then applying brake to the motor to decelerate the same to thereby decelerate the door, and measuring the initial acceleration and the deceleration upon braking of the door; thereafter causing the door to conduct a low speed closing operation to its closing - stop point; and comparing the measured initial acceleration and deceleration upon braking of the door with a preset acceleration and a preset deceleration, respectively, upon stopping of the door at its closing-stop point, and outputting a signal which is indicative of the occurrence of abnormal condition if the difference is out of an allowable range, or causing the door to conduct normal opening/closing operation if the difference is within the allowable range.

By this method, it can be readily detected that the initial acceleration and the deceleration upon braking of the door are within their respective ranges.

According to the present invention having the above-mentioned aspects incorporated can offer the undermentioned advantages and effects.

1. It is detected by the difference between the measured opening stroke and the measured closing stroke of the door whether or not the door 4 is slipping, and in case the belt is slipping, a signal indicative of abnormal condition is outputted, and therefore whether or not the belt is slipping can be checked readily and the door can be prevented from conducting its normal opening/closing operation with the belt slipping.

2. Since the arrangement is made such that the door is caused to conduct a high speed opening/closing operation by a predetermined distance, the time needed for the door to conduct opening/closing operation can be reduced and it can be checked in a short time whether or not the belt is slipping.

3. Since a signal indicative of abnormal condition is transmitted in case the initial acceleration and the deceleration upon braking of the door are out of their respective preset ranges, it can be found out that the initial acceleration and the deceleration or braking of the door differ from their respective preset values. As a result, it can be found that the reduction gear, the rail or the motor driving circuit is in abnormal condition so that the door can be prevented from conducting its normal opening/closing condition in abnormal or improper working condition.

The above-mentioned and other objects, aspects and advantages of the present invention will become apparent to those skilled in the art by making reference to the following description and the accompanying drawings in which preferred embodiments incorporating the principles of the present invention are shown by way of example only.

DETAILED DESCRIPTION OF THE PREFERRED EMBODIMENTS

The present invention will now be described below by way of example only with reference to the accompanying drawings.

Figure 1:
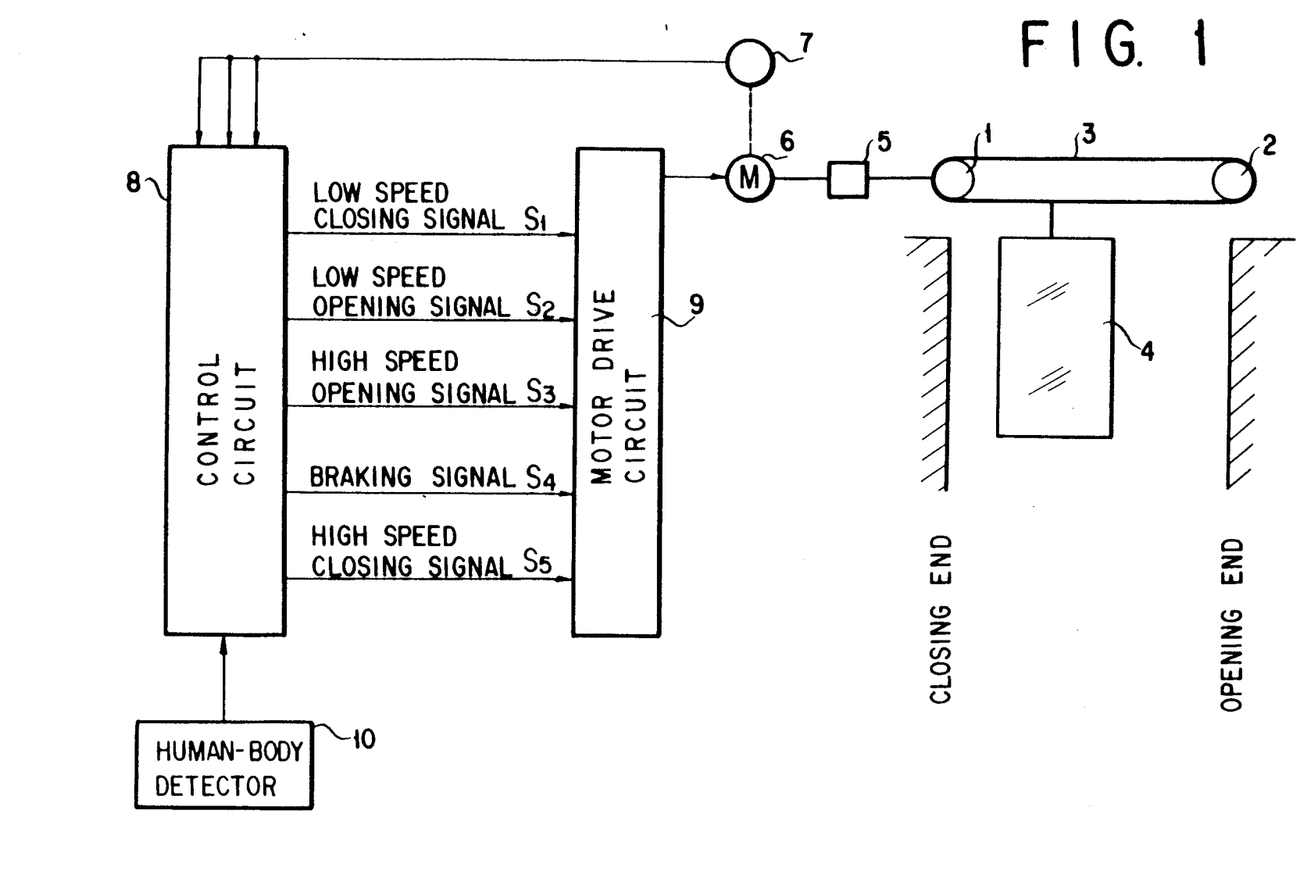
FIG. 1 is a schematic view showing an apparatus for controlling opening/closing of a door in an automatic door system for carrying out the method for controlling the opening/closing operation of the door according to the present invention.

As shown in FIG. 1, a belt 3 is wound round a drive pulley 1 and a driven pulley 2. The drive pulley 1 is connected through a reduction gear 5 to an electric motor 6. The arrangement is made such that when the electric motor 6 is driven the door 4 is caused to conduct its opening/closing movements between its closing-stop point and its opening-stop point.

The above-mentioned motor 6 has a rotating shaft to which is connected a pulse generator 7 adapted to output pulses whose count is proportional to the number of revolutions of the motor 6.

The pulses generated by the pulse generator 7 are inputted to a control circuit 8 which will then output a control signal to a motor driving circuit 9 so as to control the drive of the motor 6 as will be mentioned later.

Reference numeral 10 denotes a human-body detector unit such as, for example, a mat switch adapted to transmit a human-body detection signal to the control circuit 8 as an input thereof.

The above-mentioned pulse generator 7 is, for example, a pulse encoder adapted to transmit a discrimination signal indicative of the rotational direction of the motor 5 and pulses which are proportional to the number of revolutions of the motor 5 to the control circuit 8 as inputs thereof.

Further, the arrangement can also be made such that the motor driving circuit 9 may transmit pulses whose count is proportional to the number of revolutions of the motor 5 and a signal representative of opening/closing operation of the door to the control circuit 8 as inputs thereof.

Figure 2:
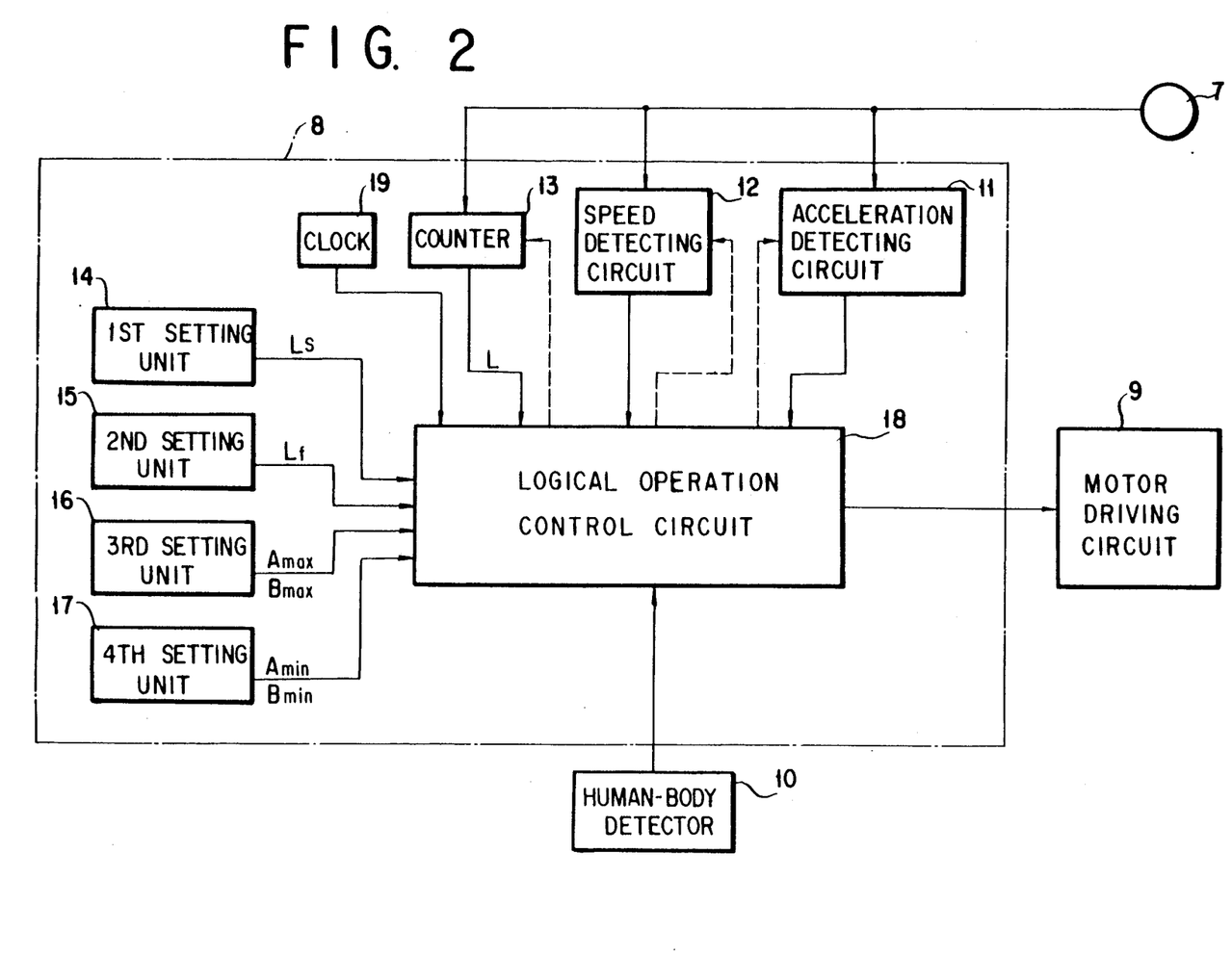
FIG. 2. is an explanatory view showing a control circuit for use with the apparatus in detail.

The above-mentioned control circuit 8 comprises, as shown in FIG. 2, an acceleration detecting circuit 11, a speed detecting circuit 12, a counter 13 including a counter drive circuit and a counting function part, a clock 19, first, second, third and fourth setting units 14, 15, 16 and 17, and a logical operation control circuit 18, etc. The acceleration detecting circuit 11 is adapted to detect the acceleration of the door on the basis of a change in the pulse intervals which is computed by comparing a reference pulse from the clock 19 with an input pulse. In like manner, the speed detecting circuit 12 is adapted to discriminate that the door 4 has been stopped by finding out the increase in the pulse intervals and output a signal indicative of stopping of the door. Further, the counter 13 is adapted to subtract or add the digital figure displayed on it when it is driven by output transmitted by the counter drive circuit thereof which is activated by pulses generated by the pulse generator when the door 4 conducts its opening operation and closing operation, respectively. The first, second, third and fourth setting units 14, 15, 16 and 17 store fixed values, respectively, which will be mentioned later, and the logical operation control circuit 18 is adapted to conduct control of logical operations which will be mentioned later on the basis of each of the fixed values and transmit a variety of signals to the motor driving circuit 9.

In the next place, one embodiment of the method for controlling the opening/closing of a door will be described.

1. After the power supply switch is turned on, the motor is driven so as to move the door 4 to its closing end position, namely, closing-stop point. In case the door 4 is closed when the power supply is put to work, even if the motor is subjected to a driving force, the door will not move.

2. When the closing-stop point of the door 4 is detected and an initial opening signal is inputted, the door 4 is caused to conduct an opening operation until it reaches its opening end position, namely, opening-stop point. The actual distance of movement, the initial acceleration and deceleration upon braking of the door 4 at that time are measured and stored in the logical operation control circuit 18. When the door 4 is stopped at the opening-stop point and a door opening signal is not inputted, the door 4 is caused to conduct its closing operation until it reaches its closing-stop point, and the actual distance of movement, the initial acceleration and the deceleration upon braking of the door 4 at that time are measured and stored in the logical operation control circuit 18. 3. The actual distance of movement of the door 4 in case of the above-mentioned opening operation is compared with that in case of the closing operation, and as a result, if they are equal or the difference between them is within a predetermined allowable range, then it is discriminated the belt 3 is free from slip, whilst if the difference between them is more than the allowable range, then it is discriminated that the belt 3 is slipping, and an alarm for abnormal conditions is given by actuating a buzzer, for example, and operations in case of abnormal conditions will be conducted.

Stating more specifically, if the belt 3 slips, then the relationship between the number of revolutions of the motor 6 and the distance of movement of the door 4 will deviate from a predetermined fixed ratio, and an error occurs when the opening/closing operation of the door 4 is controlled by measuring the distance of movement of the door 4 on the basis of pulses whose count is proportional to the number of revolutions of the motor 6. Therefore, as mentioned above, it is detected whether or not the belt 3 is slipping, and as a result, if the belt 3 is slipping, then the belt 3 and the drive pulley 2 are inspected to find out the cause of the slip and, after making repairs or maintenance of them so as to eliminate the slip, normal opening/closing operation which will be mentioned later will be conducted.

Simultaneously with this operation, if the thus detected initial acceleration and deceleration upon application of braking of the door 4 are out of their respective preset ranges between their respective maximum and minimum accelerations, then it is discriminated that the initial acceleration and the deceleration upon braking of the door are abnormal, and an alarm for abnormal conditions is given by actuating a buzzer, for example, and operations in case of abnormal condition will be conducted.

Stating more specifically, the initial acceleration and the deceleration upon braking of the door are decided by the weight and the resistance to sliding of the door or the electric current supplied to the motor 6, and the performance of the motor 6, etc. If the initial acceleration and the deceleration upon braking of the door differ from their respective preset values, then at the time of normal opening/shutting operation the door 4 cannot be moved smoothly to open or close it. Therefore, as mentioned above, it is detected whether or not the initial acceleration and the deceleration upon braking of the door are abnormal, and as a result, if abnormal conditions exist, then after eliminating the abnormality so as to restore the door to its normal working condition, tests are made, and then the door is put again in the normal opening/closing operation.

In the next place, each of the operations of the door is described in detail.

1. Operations for moving door 4 to its closing-stop point:

1-1 After the power supply is switched on, if it has passed 10 seconds with the logic operation control circuit 18 kept without receiving human-body detection signal MS as input thereof, the content of the counter 13, namely, the actual distance L of movement of the door 4 is compared with a preset distance $L_S$ stored in the first setting unit 14.

At that time, since the door 4 is kept stationary, the actual distance L of movement of the door 4 is zero, and hence $L_S$ is more than L ($L_S > L$). Therefore, a low speed closing signal $S_1$ is transmitted by the logical operation control circuit 18 to the motor driving circuit 9 so that the motor 6 is driven or rotated forwardly at a low speed to cause the door 4 to conduct a low speed closing operation so as to move the door 4 to its closing-stop point, and the pulses generated by the pulse generator 7 during the low speed closing operation are counted by the counter 13 so as to measure the actual distance L over which the door 4 has been moved. If a human-body detection signal $M_s$ is inputted to the logical operation control circuit 18 when the door is in a low speed closing operation, control of opening operation which will be mentioned later is conducted.

Figure 3:
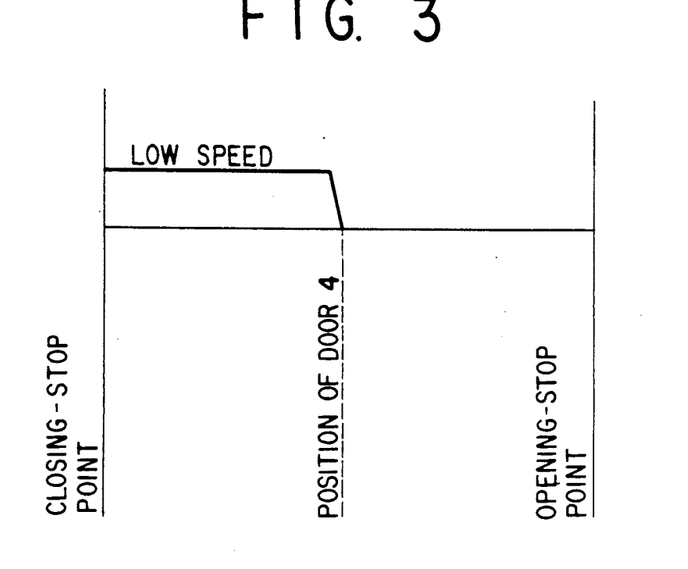
FIGS. 3 and 4 are diagrams, respectively, showing the operations of moving the door to its closing stop point.

When the door 4 has reached its closing-stop point, the intervals of the pulses inputted to the speed detecting circuit 12 becomes longer, whereby detecting that the door 4 has been moved to the closing-stop point. This operation is diagrammatically illustrated in FIG. 3.

Further, a limit switch may also be used to detect that the door 4 has been moved to its closing-stop point.

1-2 When the human-body detection signal $M_s$ is inputted to the logical operation control circuit 18 before the lapse of 10 seconds after the power supply is switched on, and also when the human-body detection signal $M_s$ is inputted during the aforementioned low speed closing operation, the preset distance $L_S$ is compared with the actual distance L of movement of the door 4 during the closing operation thereof as described hereinabove, and if $L_s$ is more than L ($L_s > L$), then the logical operation control circuit 18 will transmit a low speed opening signal $S_2$ to the motor driving circuit 9 so as to cause the door 4 to conduct a low speed opening operation. Whilst, if $L_s$ is less than L ($L_s < L$), then the logical operation control circuit 18 will transmit a high speed opening signal $S_3$ to the motor driving circuit 9 so as to cause the door 4 to conduct opening operation at a speed higher than the above-mentioned low speed by the value of $L_s - L_f$, and then conduct a low speed opening operation. Fruther, reference character $L_f$ is a preset value stored in the second setting unit 15.

At the time of this opening operation of the door, the pulses generated by the pulse generator 7 are counted by means of the counter 13 so as to measure the actual distance L over which the door 4 has been moved.

When the door has been moved to a stop point in its opening operation or an opening-stop point, the latter is detected by means of the speed detecting circuit 12, as mentioned above, whereby stopping the motor 6 so as to stop the door 4 at the opening-stop point. When the input of the human-body detection signal $M_s$ to the control circuit 18 is discontinued, the operations given in Item 1-1 above are performed so as to cause the door to conduct a closing operation to its closing-stop point.

Figure 4:
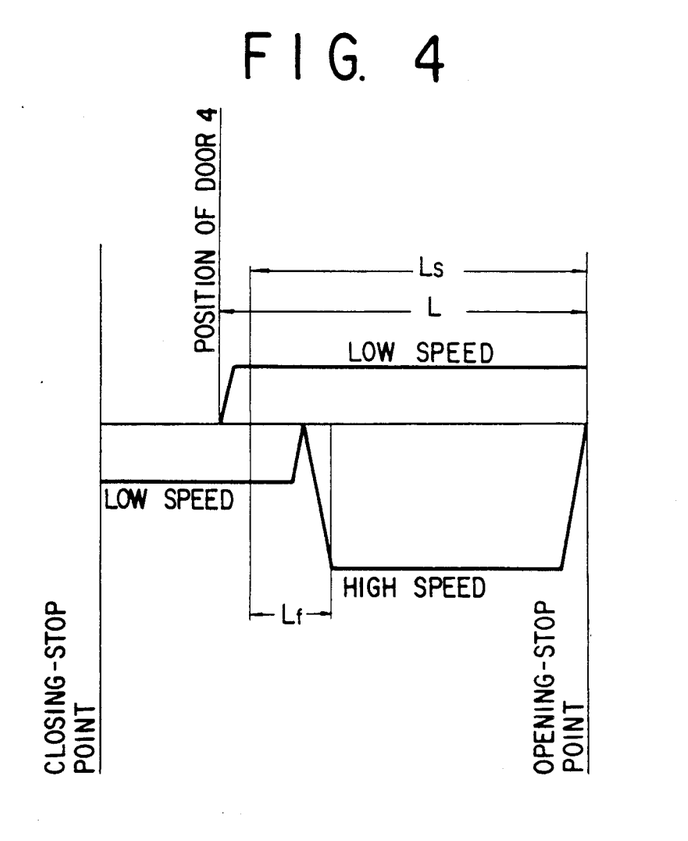

When the door 4 is in this closing operation, the actual distance L of movement of the door during the aforementioned opening operation is compared with the preset distance $L_s$, and as a result, if $L_s$ is more than L ($L_s > L$), then the door 4 is caused to conduct a closing operation at a low speed. Whilst, if $L_s$ is less than L ($L_s < L$), then the door is caused to conduct a closing operation at a speed higher than the above-mentioned low speed by the value of $L_s - L_f$, and then conduct a low speed closing operation until it is stopped at its closing-stop point. The movement of the door 4 when $L_s$ is less than L ($L_s < L$) is diagrammatically illustrated in FIG. 4.

Figure 5:
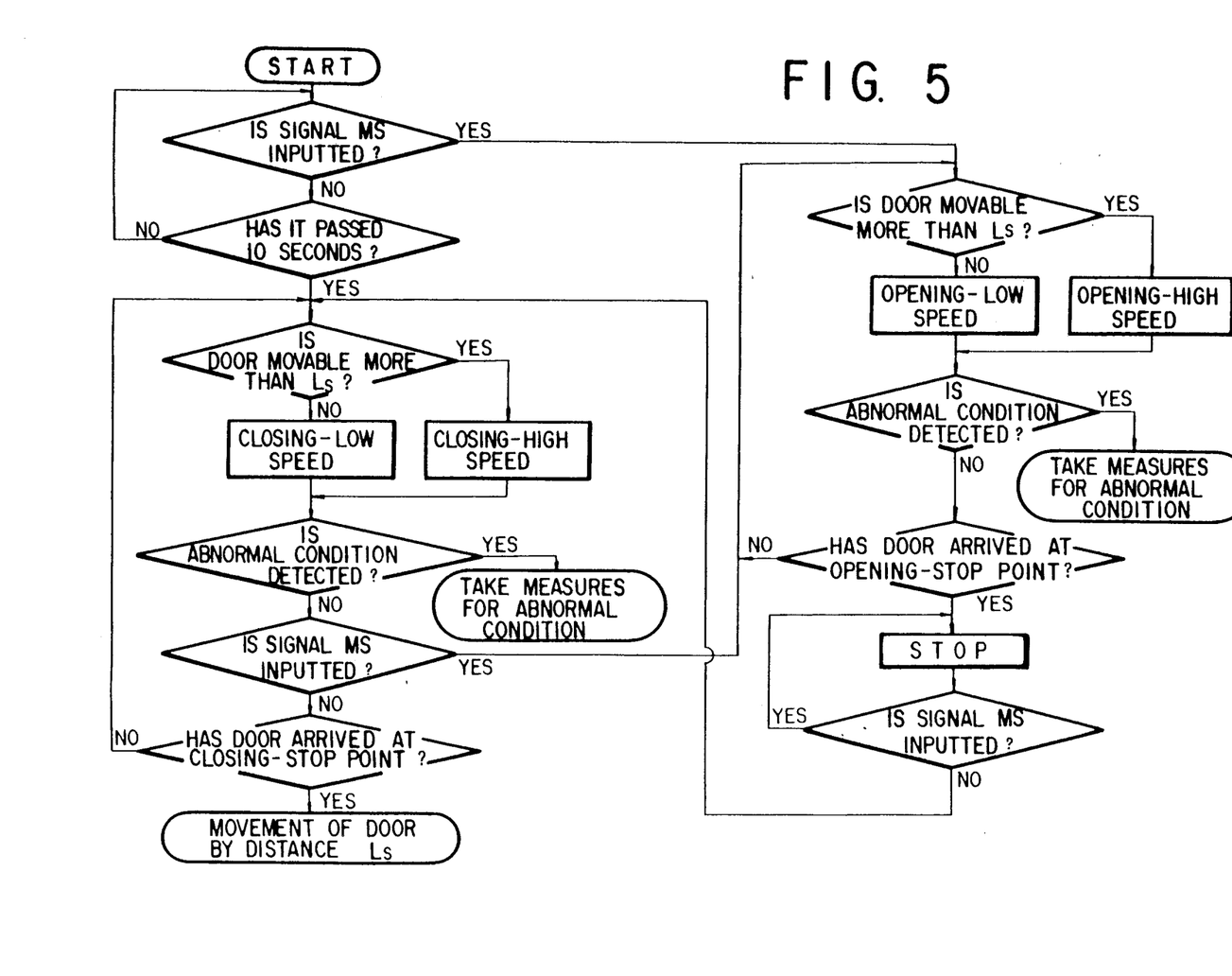
FIG. 5 is a flowchart showing the operations of the automatic door system.

The above-mentioned movement of the door 4 to its closing-stop point is illustrated in the form of flowchart in FIG. 5. The door 4 can be moved to the closing-stop point even if it assumes any position when the power supply switch is turned on, and also in case the door 4 has been moved in its opening direction more than the preset distance $L_s$, the door 4 can conduct a closing operation at a speed higher by the value of $L_s - L_f$ so that the door 4 can be moved to the closing-stop point in a short time and stopped there.

Further, the expression "detection of abnormal condition" is meant by the case where the door 4 is locked or the lane of the door is clogged with an obstacle which renders it unable to conduct opening/closing operation. In such case, an alarm is given by actuating a buzzer and the opening/closing operation of the door is interrupted.

2. Opening/closing operations for detecting abnormal conditions:

2-1 Upon confirming that the door 4 has reached the closing-stop point after the power supply switch is turned on as mentioned above, when the logical operation control circuit 18 receives an initial door opening signal, the control circuit 18 will output or transmit a high speed opening signal $S_3$ to the motor driving circuit 9 so as to cause the door 4 to conduct a high speed opening operation. Then, the actual distance L of movement of the door 4 is measured by counting the pulses generated by the pulse generator 7 by means of the counter 13. When the door 4 has been moved by a distance of $L_s - L_f$, the logical operation control circuit 18 will transmit a braking signal $S_4$ to the motor driving circuit 9 to apply braking force to the motor 6 so as to decelerate the same to thereby decelerate the door 4. When it is detected by the speed detecting circuit 12 that the moving speed of the door 4 is zero, the logical operation control circuit 18 will output a low speed opening signal $S_2$ to the motor driving circuit 9 so as to cause the door 4 to conduct a low speed opening operation until it reaches the opening-stop point.

The opening stroke Lmost of the door 4 from the closing-stop point to the opening stop point at that time is measured by counting the pulses generated by the pulse generator 7 by means of the counter 13, and the value of the stroke is stored by the logical operation control circuit 18. Further, the initial acceleration A mo and the deceleration on braking B mo are detected by means of the acceleration detecting circuit 11 and the detected values are stored by the logical operation control circuit 18.

When it is detected by the speed detecting circuit 12 that the door has been stopped at the opening-stop point, and if a door opening signal is not inputted to the logical operation control circuit 18 at that time, then the control circuit 18 will output or transmit a high speed closing signal $S_5$ to the motor driving circuit 9 so as to cause the door to conduct a high speed closing operation. The actual distance L of movement of the door 4 at that time is measured by counting the pulses generated by the pulse generator by means of the counter 13. When the door 4 has been moved by a distance which corresponds to the value of $L_s - L_f$, the logical operation control circuit 18 will transmit a braking signal $S_4$ to the motor driving circuit 9 so as to apply a braking force to the motor 6 to thereby decelerate the door 4. When it is detected by the speed detecting circuit 12 that the speed of the door has been reduced to zero, the logical operation control circuit 18 will output or transmit a low speed closing signal $S_1$ to the motor driving circuit 9 so as to cause the door 4 to conduct a low speed closing operation until it reaches the closing-stop point and is stopped there.

The closing stroke L most of the door 4 from the opening-stop point to the closing-stop point at that time, the initial acceleration A mc and the deceleration upon braking B mc are measured and stored in the logical operation control circuit 18.

When it is detected by the speed detecting circuit 12 that the door has been stopped at the closing-stop point as mentioned hereinbefore, the logical operation control circuit 18 will conduct discrimination of the occurrence of abnormal condition.

In the first place, comparison is made to find out whether the measured initial accelerations A mo, A mc and decelerations upon braking B mo, B mc are within the range between the maximum acceleration and the maximum deceleration A max and B max preset by the third setting unit 16 and the minimum acceleration A min and the minimum deceleration B min preset by the fourth setting unit 17, respectively, and as a result, if the acceleration A mo, A mc and the deceleration upon braking B mo, B mc are out of the range, it is discriminated that abnormal conditions occur. Further, the difference between the measured opening stroke L most and closing stroke L mcst is computed, and, as a result, if the difference is more than a preset value L ref, then it is discriminated that abnormal condition occurs.

When it is discriminated that abnormal condition occurs, a buzzer is rendered operative to give an alarm, and also when the human-body detection signal is inputted, the door 4 is caused to conduct a low speed opening/ closing operation.

Figure 6:
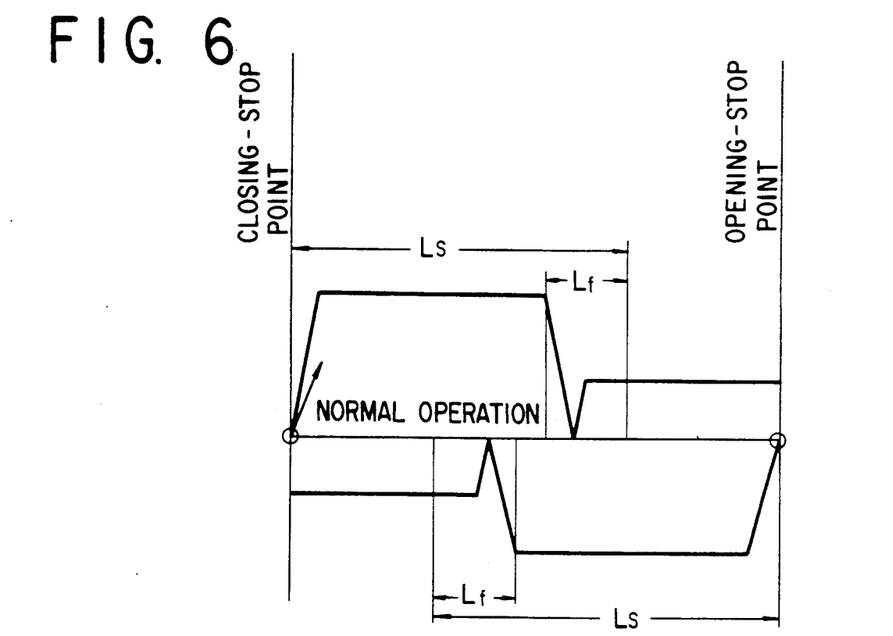
FIGS. 6 and 7 are diagrams, respectively, showing the opening/closing operations of the door for discriminating abnormal condition.

The above-mentioned operations are diagrammatically illustrated in FIG. 6.

2-2 The operations mentioned in Item 2-1 above are conducted in case no human-body detection-signal is inputted to the logical operation control circuit 18 while the door 4 is conducting a closing operation. The operations to be conducted in case a human-body detection signal is inputted will be described below.

Figure 7:
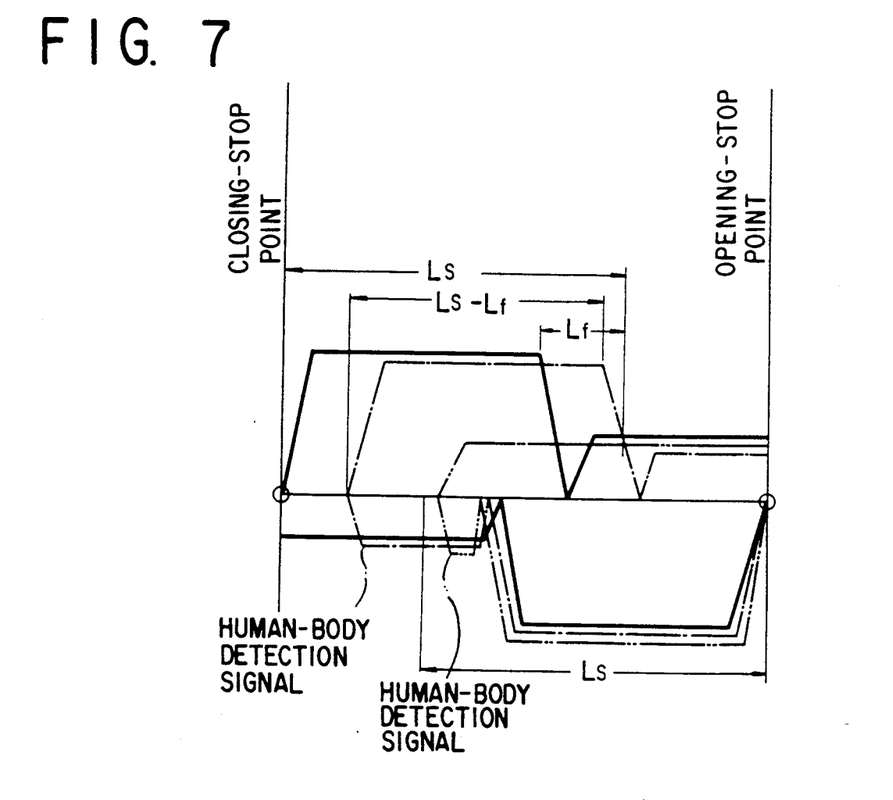

As mentioned in the Item 2-1 above, the door 4 is caused to conduct a high speed closing operation from its opening-stop point. When the human-body detection signal Ms is inputted to the logical operation control circuit 18 while the door is conducting a low speed closing operation, the control circuit 18 will output or transmit a braking signal $S_4$ to the motor driving circuit 9 to thereby stop the motor 6. When the door 4 has been stopped, the actual distance L of movement of the door 4 during the closing operation is inputted into the control circuit 18. Then, the actual distance L of movement of the door 4 is compared with the preset distance $L_s$, and as a result, if L is more than $L_s$ ($L > L_s$), then the door 4 is caused to conduct an opening operation at a speed higher by the value of $L_s - L_f$ as shown by one-dot chain line in FIG. 7, and thereafter conduct a low speed opening operation until it reaches the opening-stop point. Whilst, in case L is less than $L_s$ ($L < L_s$), the door 4 is caused to conduct a low speed opening operations as shown by two-dot chain line until it reaches the opening-stop point. When the door has been stopped at the opening-stop point, the door 4 is caused to conduct again opening operation at a speed higher by the value of $L_s - L_f$ as mentioned above, and thereafter conduct a low speed closing operation until it reaches the closing-stop point.

Figure 8:
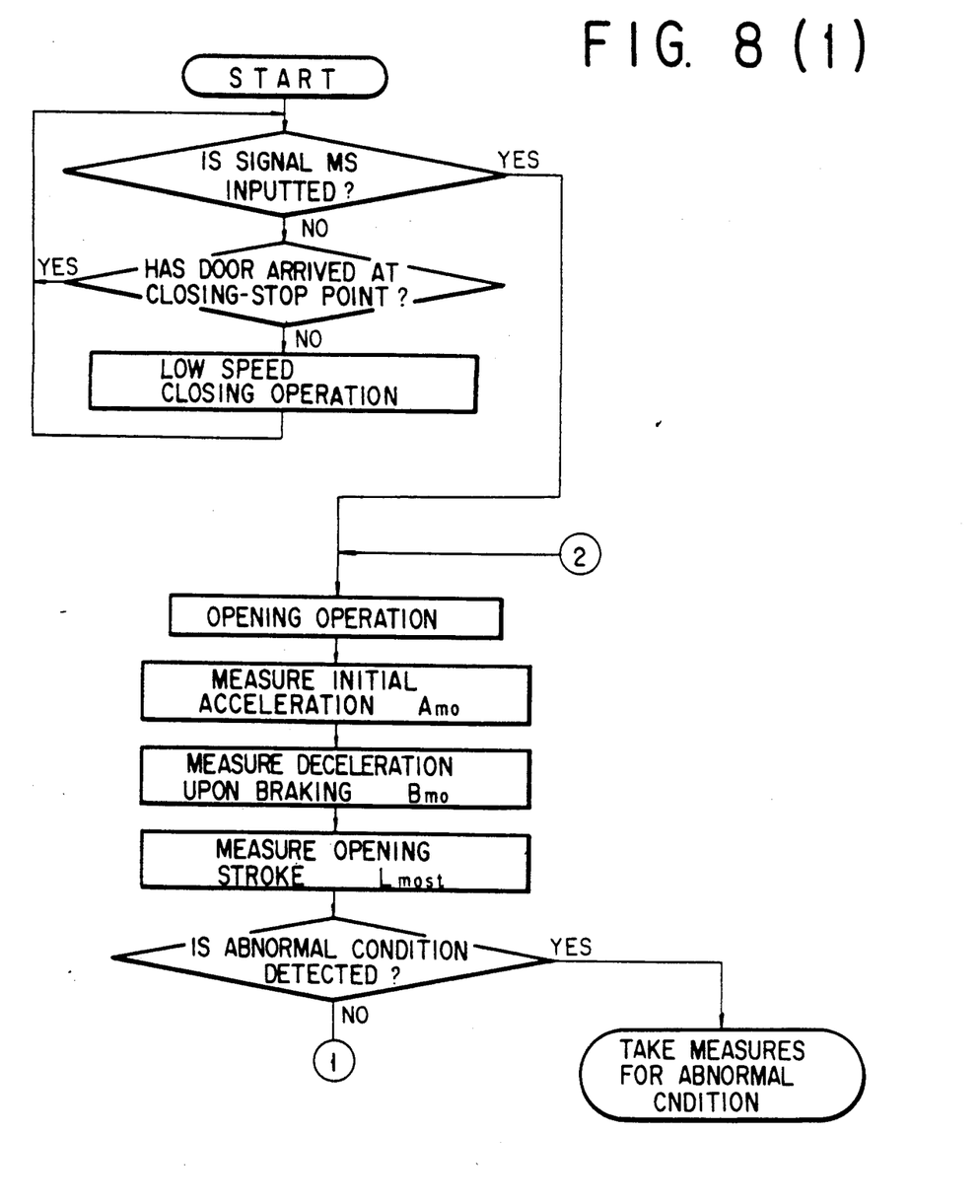
FIG. 8 is a flowchart showing the operations for discriminating abnormal condition.

The above operations are illustrated in the form of a flowchart in FIG. 8.

Since the door 4 is caused to conduct a high speed opening operation by a distance of $L_s - L_f$ before it is caused to stop once and conduct opening operation again after a human-body detection signal is inputted to the logical operation control circuit 18. Therefore, the door can be moved quickly to its opening-stop point, and also in case there is a risk of the door striking against the opening-stop point if the door is caused to conduct an opening operation at a speed higher by the value of $L_s - L_f$, then the door is caused to conduct a low speed opening operation so that the door 4 can be prevented from striking against the opening-stop point.

Whether or not abnormal condition occurs is discriminated as mentioned above, and as a result, if no abnormal condition occurs, then the door is caused to conduct the normal opening/closing operations.

For example, braking points for opening and closing operations, respectively are set on the basis of the closing stroke L mcst which is measured at the time of the closing operation in the above-mentioned opening/closing operation for discriminating abnormal conditions. The actual distance of movement of the door 4 is measured by counting the pulses generated by the pulse generator 7 which are proportional to the number of revolutions of the motor 6 by means of the counter 13. If the actual distance of movement of the door corresponds to the door braking point, then the motor 6 is applied with braking force so as to decelerate and stop it. After that, the door is caused to conduct either opening operation or closing operation to move it to its opening-stop point or its closing-stop point.

Am embodiment of the normal opening/closing operation will now be described below with reference to FIG. 9.

Figure 9:
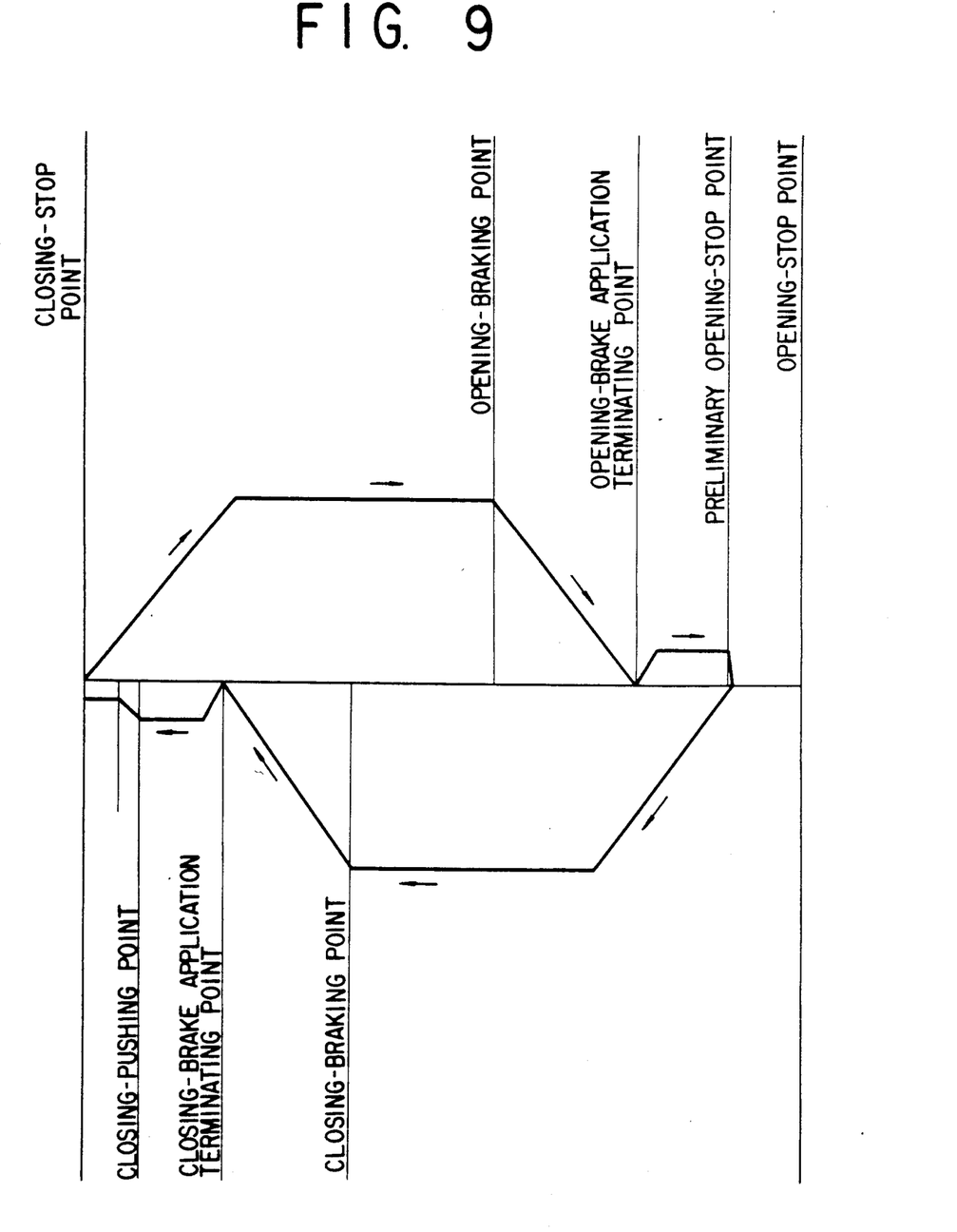
FIG. 9 is a diagram showing one embodiment of the normal opening/closing operations of the automatic door system.

As shown in FIG. 9, a braking point for opening operation, a brake application terminating point for opening operation, and a stopping point for opening operation are set on the basis of the opening-stop point as the reference thereof, the stopping point for opening operation in this case is set at a position somewhat away from the opening-stop point as a preliminary opening-stop point, and a braking point for closing operation, a brake application terminating point for closing operation, and a pushing point for closing operation are set on the basis of the closing-stop point as the reference thereof.

When a human-body detection signal is inputted to the logical operation control circuit 18, the motor 6 is driven or rotated forwardly at a high speed so as to cause the door 4 to conduct a high speed opening operation. When the door is moved to the braking point for opening operation, the braking means is rendered operative to decelerate the rotating speed of the motor 6 and hence reduce the moving speed of the door 4. When the door 4 has been moved to the brake application terminating point for opening operation, the motor 6 is driven or rotated forwardly at a low speed so as to cause the door 4 to conduct a low speed opening operation. When the door 4 has been moved to the stopping point for opening operation, the motor 6 is stopped so as to stop the door 4 at a position somewhat away from the opening-stop point to thereby prevent the door 4 from striking against the door-stop on the door opening side.

In a predetermined fixed time after the input of the human-body detection signal to the logical operation control circuit 18 is ceased, the motor 6 is rotated reversely at a high speed so as to cause the door 4 to conduct a high speed closing operation. When the door 4 has been moved to the braking point for closing operation, the motor 6 is applied with a braking force so as to decelerate the motor, and hence decelerate the door 4. When the door 4 has reached the brake application terminating point, the rotational speed of the motor 6 is reduced so as to cause the door to conduct a low speed closing, operation. When the door 4 has been moved to the pushing point for closing operation, the output torque developed by the motor 6 is reduced to a very low value, and the rotational speed of the motor 6 is reduced to a further lower value so as to cause the door 4 to conduct closing operation at a further lower speed to bring the door into contact with the door-stop at the closing-stop point and enable the door 4 to be pushed continuously against the door stop by a very weak force.

This enables airtight sealing material inserted between the door 4 and the door stop to be compressed so as to provide a satisfactory airtight condition.

It is to be understood that the foregoing description is merely illustrative of preferred embodiments of the present invention, and that the scope of the present invention is not to be limited thereto, but is to be determined by the scope of the appended claims.

What is claimed is:

1. A method for controlling opening/closing of a door in an automatic door system comprising the steps of:
    causing the door to conduct an opening operation to its opening-stop point by the action of an initial opening signal transmitted after a power supply switch is turned on and the arrival of the door at its closing-stop has been confirmed, and measuring the length of opening stroke of the door at that time;
    causing the door to conduct a closing operation to its closing-stop point when the door is stopped at the opening-stop point and no opening signal is inputted, and measuring the length of closing stroke of the door at that time; and
    computing the difference between the measured length of opening stroke and that of closing stroke when the door is stopped at the closing-stop point, and outputting a signal indicative of the occurrence of abnormal condition if the difference in stroke is more than a preset value, or causing the door to conduct its normal opening/closing operation if the difference in stroke is less than the preset value.

2. A method for controlling opening/closing of a door in an automatic system as claimed in claim 1, wherein after confirmation of arrival of said door at the closing-stop point the door is caused to conduct opening/closing operation at a high speed over a preset distance in the initial stage of the whole stroke and then conduct the operation at a low speed.

3. A method for controlling opening/closing of a door in an automatic door system comprising the steps of:

causing the door to conduct a high speed opening operation over a predetermined distance by the action of an initial opening signal transmitted after a power supply switch is turned on and the arrival of the door at its closing stop point has been confirmed, and then applying brake to a door driving motor to decelerate the same to thereby decelerate the door, and measuring the initial acceleration and the deceleration upon braking of the door;

causing the door to conduct a low speed opening operation to its opening-stop point;

subsequently causing the door to conduct a high speed closing operation by a predetermined distance when the door is stopped at its opening-stop point and door opening signal is not inputted, and then applying brake to the motor to decelerate the same to thereby decelerate the door, and measuring the initial acceleration and the deceleration upon braking of the door at that time;

thereafter causing the door to conduct a low speed closing operation to its closing-stop point; and comparing the measured initial acceleration and deceleration upon braking of the door with a preset acceleration and a preset deceleration upon stopping of the door at its closing-stop point, and outputting a signal which is indicative of the occurrence of abnormal condition if the difference is out of an allowable range, or causing the door to conduct normal opening/closing operation if said difference is within the allowable range.

4. A method of controlling opening/closing of a door in an automatic door system as claimed in claim 3 comprising the steps of:

measuring the opening stroke and the closing stroke of said door in opening and closing operations, respectively;

computing the difference between the measured opening stroke and closing stroke with a preset value when the door is stopped at its closing-stop point, and outputting a signal indicative of abnormal condition if the difference is more than a preset value, or causing the door to conduct normal opening/closing operation if said difference is less than the preset value.

* * * * *